H. J. McGUCKIN.
SANITARY TUB AND SINK TRAP.
APPLICATION FILED JULY 11, 1917.
1,378,181.
Patented May 17, 1921.
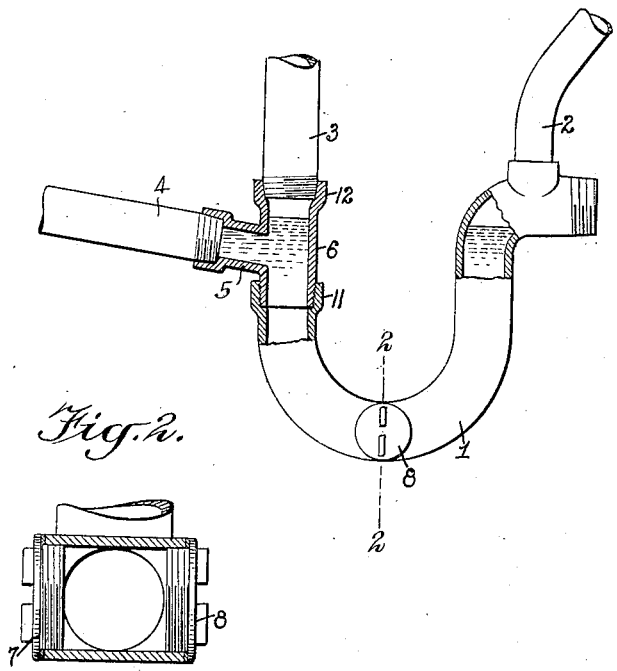
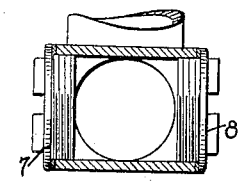
WITNESSES
INVENTOR
H.J.McGuckin
BY
ATTORNEYS

UNITED STATES PATENT OFFICE.

HENRY J. McGUCKIN, OF NEW YORK, N. Y.

SANITARY TUB AND SINK TRAP.

1,378,181.  Specification of Letters Patent.  Patented May 17, 1921.

Application filed July 11, 1917. Serial No. 179,788.

*To all whom it may concern:*

Be it known that I, HENRY J. McGUCKIN, a citizen of the United States, and a resident of the city of New York, borough of Manhattan, in the county and State of New York, have invented a new and Improved Sanitary Tub and Sink Trap, of which the following is a full, clear, and exact description.

This invention relates to plumbing supplies and particularly to a trap, and has for an object the provision of an improved construction which will properly trap one or more fixtures.

Another object in view is to provide a trap which may be readily connected to a tub and sink and trap both articles against the passage of gas from the sewer to either article or from one article to the other.

A still further object, more specifically, is the provision of a trap to which two or more drain pipes may be connected, the connection for most of the pipes being beneath the level of the water in the trap.

In the accompanying drawing:

Figure 1 is a side view with certain parts broken away of a trap disclosing an embodiment of the invention.

Fig. 2 is a section through Fig. 1 on line 2—2, the same being on an enlarged scale.

Referring to the accompanying drawing by numerals, 1 indicates a trap which may be of the U shape variety or may be of the complete S or partial S variety as preferred. When formed as shown in Fig. 1 the vent pipe 2 is connected at the upper part of one leg of the trap while the drain pipe 3 from the drainage member has, for instance, a tube which is connected to the top of the other leg, while the drain pipe 4 from the sink or other member is connected to the section 5 of the fitting 6 and discharges below the surface of the water in the trap. This will prevent the gases from pipe 5 entering pipe 4, or the reverse, while allowing a free drainage of the liquid into the trap and from thence into the sewer. The bottom of the trap 1 may be provided with a clean-out opening or clean-out openings 7 and 8 may be arranged on the sides as shown in Fig. 2.

In Fig. 1 the fitting 6 is what is known as a street fitting, with one end fitting into the threaded bell 11 of trap 1 while the bell 12 at the opposite end accommodates the pipe 3. By the construction and arrangement shown a tub and a sink may be connected to the same trap and both members thoroughly trapped against the return of sewer gas and against the passage of gas or fumes from one member to the other by reason of the water level in the trap which is above the discharge pipe 4. It will of course be evident that if other connections were provided in the fitting 6 more than two tubs could be connected to the same trap, though ordinarily the fitting 6 is preferable as otherwise there would be too large an amount of drainage water to pass through a single trap. It will also be evident that the fitting 6 could be arranged so that pipe 4 could project in any direction desired, as for instance, from either side or as shown in the drawing.

What I claim is:

1. In a trap of the character described, a substantially U-shaped body provided with a discharge opening in one leg and a threaded end for receiving a T fitting on the opposite leg, said T fitting having the entrance of the T below the water line of said body whereby two independent drain pipes may be connected to said T and the passage of gas from one pipe to the other prevented.

2. A trap, comprising a substantial U pipe with low and high ends, the high end being turned into an outlet, said outlet being arranged to receive an L of any angle to reach a waste pipe regardless of location; and a T fitted into the low end, capable of being turned in any direction to meet a plurality of waste connections from as many appliances, the horizontal inlet to the T coming below the water line by virtue of said low end, to prevent odors from the trap reaching any appliance, or from any appliance to the other through said waste connections.

HENRY J. McGUCKIN.